(12) United States Patent
Strieker

(10) Patent No.: US 8,851,276 B2
(45) Date of Patent: Oct. 7, 2014

(54) DEVICE FOR TENSIONING A TENSION MECHANISM OF A CONVEYING DEVICE

(71) Applicant: CLAAS Selbstfahrende Erntemaschinen GmbH, Harsewinkel (DE)

(72) Inventor: Norbert Strieker, Verl (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 13/862,621

(22) Filed: Apr. 15, 2013

(65) Prior Publication Data

US 2013/0277178 A1    Oct. 24, 2013

(30) Foreign Application Priority Data

Apr. 18, 2012  (DE) .......................... 10 2012 007 637

(51) Int. Cl.
| | |
|---|---|
| B65G 23/44 | (2006.01) |
| B65G 23/02 | (2006.01) |
| A01D 61/02 | (2006.01) |
| B65G 15/60 | (2006.01) |
| F15B 15/20 | (2006.01) |

(52) U.S. Cl.
CPC ................ *B65G 15/60* (2013.01); *A01D 61/02* (2013.01); *B65G 23/44* (2013.01); *F15B 15/204* (2013.01)
USPC .......................... 198/813; 198/810.04; 56/14.6

(58) Field of Classification Search
USPC ............. 198/810.04, 813; 56/14.6, 14.5, 16.6
See application file for complete search history.

(56) References Cited

U.S. PATENT DOCUMENTS

| | | | | |
|---|---|---|---|---|
| 2,788,883 | A | * | 4/1957 | Schwenk ....................... 198/813 |
| 4,362,005 | A | * | 12/1982 | Hanaway et al. .............. 56/14.6 |
| 4,508,213 | A | * | 4/1985 | Kelley ........................... 198/813 |
| 4,799,584 | A | * | 1/1989 | Hartsuiker et al. ............ 198/709 |
| 5,641,058 | A | * | 6/1997 | Merten et al. ............. 198/810.04 |
| 6,516,941 | B1 | | 2/2003 | Buhne |
| 6,695,130 | B1 | * | 2/2004 | Blaylock et al. .............. 198/813 |
| 6,802,414 | B2 | * | 10/2004 | Buhne ........................... 198/813 |
| 7,117,989 | B2 | * | 10/2006 | Weigel et al. ............. 198/810.04 |
| 7,798,313 | B2 | * | 9/2010 | Hesketh ........................ 198/814 |
| 7,837,021 | B2 | * | 11/2010 | Ichikawa et al. .............. 198/329 |
| 7,980,384 | B2 | * | 7/2011 | Phalen .......................... 198/716 |

FOREIGN PATENT DOCUMENTS

| | | |
|---|---|---|
| DE | 39 15 227 | 12/1989 |
| DE | 199 25 691 | 12/2000 |

* cited by examiner

*Primary Examiner* — James R Bidwell
(74) *Attorney, Agent, or Firm* — Michael J. Striker

(57) ABSTRACT

A device for tensioning a tension mechanism of a conveying device includes a number of feeder aids extending between a drive wheel and at least one guide wheel. At least one hydraulic cylinder (including a hydraulic piston) adjusts a wheel center distance between the at least one guide wheel and the drive wheel in order to change the tension of the tension mechanism. The at least one hydraulic cylinder acts directly on the guide wheel. In order to tension the tension mechanism, the hydraulic piston is displaceably disposed in a pressure chamber and acted upon by pressure medium from a pressure source via a check valve that opens toward the pressure chamber. Once a blocked state of the check valve is reached, the pressure chamber is connected to a device for receiving a defined volume of pressure medium.

12 Claims, 4 Drawing Sheets

DEVICE FOR TENSIONING A TENSION MECHANISM OF A CONVEYING DEVICE

CROSS-REFERENCE TO A RELATED APPLICATION

The invention described and claimed hereinbelow is also described in German Patent Application DE 10 2012 007637.1, filed on Apr. 18, 2012. This German Patent Application, subject matter of which is incorporated herein by reference, provides the basis for a claim of priority of invention under 35 U.S.C. 119(a)-(d).

BACKGROUND OF THE INVENTION

The invention relates to a device for tensioning at least one tension mechanism of a conveying device. The tension mechanism comprises a multiplicity of feeder aids that extend between a drive wheel and at least one guide wheel. In order to change the tension of the tension mechanism, the wheel center distance between the at least one guide wheel and the drive wheel is adjusted via at least one hydraulic cylinder (which acts directly on the guide wheel). In order to tension the tension mechanism, the hydraulic piston of the hydraulic cylinder (which is displaceably disposed in a pressure chamber), is acted upon by pressure medium from a pressure source via a check valve. The check valve opens toward the pressure chamber.

Conveying devices of the aforementioned type preferably are used in agricultural vehicles to transport conveyed crop (which can be grain, stalk crop, tubers, root vegetables, etc.), via a conveyance path. At least one tension mechanism is provided for this purpose in a form of a chain or belt. Feeder aids are disposed on the chain or belt at a distance from one another. These feeder aids are preferably in the shape of tines, recesses, or plates and convey the particular crop to be transported along a specified conveyance path (which preferably extends between two wheels that guide the tension mechanism).

One of the wheels is designed as a drive element and the other is designed as a guide element. The wheels preferably are formed as drive sprockets or pulleys depending on the design of the tension mechanism. A return region for the tension mechanism and the feeder aids is provided in the region of the conveying device facing away from the transport path. The conveying device preferably is disposed within a housing, wherein two separated chutes by which the conveyed crop is transported (one chute) and by which the conveying elements return (the other chute). Furthermore, such conveying devices include two tension mechanisms, which extend in parallel, and wherein the feeder aids (which are in the form of conveyor slats), are attached to both tension mechanisms.

Optimum functionality of a conveying device having such a design can be achieved by providing the tension mechanism with sufficient tension, i.e. by ensuring that said tension mechanism is not too loose. As a result, inter alia, the feeder aids can be moved in a specified position relative to the crop and the walls of the transport chute. The conveying effect of the conveying device would be greatly limited otherwise if the preload of the tension mechanism decreased. It is therefore necessary to provide means for precisely setting the preload of the tension mechanism. Within this context, devices for tensioning a tension mechanism are known, in which the wheel center distance of the aforementioned wheels is changed manually or automatically.

DE 199 25 691 A1 discloses conveying devices on a self-propelled combine harvester in the form of a grain elevator, a tailings elevator, or a feed rake. Each of these devices for tensioning the tension mechanism comprises at least one single-action hydraulic cylinder, which is supplied with pressurized hydraulic oil from a pressure medium system. A pressure chamber of this single-action hydraulic cylinder is connected to the pressure-medium supply via a check valve in the form of a non-return valve. This ensures that (in the event of diminishing preload on the tension mechanism), pressure medium enters the pressure chamber via the automatically opening non-return valve and displaces the corresponding hydraulic piston in the direction of an increase in the chain tension of the conveying device.

DE 39 15 227 A1 discloses a device for tensioning drive belts provided on the control drive of the internal combustion engine or on the generator drive. An idler pulley is supported on a control arm to act on the slack side of the belt drive. The idler pulley is preloaded by means of a tensioning device comprising a coil spring and a hydraulic cylinder. An external hydraulic system is not required to supply pressure medium to the corresponding hydraulic cylinder since pressure medium is fed to a pressure chamber of the hydraulic cylinder via a non-return valve. The pressure medium originates from an internal accumulator chamber of the hydraulic cylinder that operates as a pressure reservoir.

SUMMARY OF THE INVENTION

The present invention overcomes the shortcomings of known arts, such as those mentioned above.

In an embodiment, the invention provides a device for tensioning a tension mechanism of a conveyor device wherein tension mechanism is operated under preload that is below a maximum value. Limiting such preload prevents over tension and, therefore, operates to prevent shaft breakage and increased wear on the tension mechanism.

In the inventive device, once a blocked state of the check valve is reached, the pressure chamber is connected to a device for receiving a defined volume of pressure medium. The check valve has switching behavior with hysteresis. After the pressure medium is fed into the pressure chamber of the hydraulic cylinder via the check valve, the check valve initially closes due to an increase in pressure in the pressure chamber. Then, a defined quantity of the pressure medium present in the pressure chamber is guided to the device for receiving this volume of pressure medium, in order to relieve the pressure. The switching behavior of the check valve with hysteresis ensures that the pressure release does not result in actuation of the check valve, which would cause the check valve to open. The check valve does not reopen until the pressure drops below a lower limit value of the pressure in the pressure chamber. The pressure is defined with consideration for the volume of pressure medium that was previously removed.

Such inventive operation is patentably distinguishable from a tension mechanism of a conveying device according to DE 199 25 691 A1. As disclosed therein, any play in the conveying device is compensated for, thereby creating a relatively stiff system at risk of overtension (wherein the aforementioned risks occur). In this state, however, the belts or chains may be subjected to considerable wear, the roller bearings of the drive wheel and the guide wheel can become damaged and the shafts accommodating these wheels can even break.

According to DE 39 15 227 A1, a leakage gap provided between the pressure chamber and the supply chamber, via which a throttled return flow of pressure medium from the pressure chamber into the supply chamber can take place in order to prevent extreme belt tension. Such tensioning device, however, is suitable only for placement on a corresponding control arm connected to an idler pulley acting on the slack side of a belt drive. Such a belt tensioner functions only in a dynamic system in which the slack side of the belt results in a considerable deflection of the idler pulley. Due to these pendulum motions of the control arm (which occur in the start-up procedure of the internal combustion engine), pressure medium can flow into the pressure chamber via the non-return valve. In contrast, conveying devices of the type in question are relatively static, and so, when a tensioning mechanism comprising a leakage gap is used, a relatively long period of time would have to pass after a relatively prolonged standstill of the engine before sufficient preload on the tension mechanism could be obtained.

In the inventive device, constant preload on the tension mechanism can be attained, which brings about an optimum conveyance effect of the conveying device. Preloading of the tension mechanism result in a system that is stiff per se, and in an increase in the power uptake, is therefore eliminated. To this end, after the tension mechanism is retensioned, this preload is reduced by a slight but defined amount, thereby preventing these disadvantages.

In an embodiment, the check valve is designed as a non-return valve. A closing body of the non-return valve is spring-loaded in the direction of a pressure-medium supply bore and forms one assembly in combination with the device for receiving the defined volume of pressure medium.

Consequently, a valve housing of the non-return valve is designed to receive the defined volume of pressure medium. The spring-loaded closing body of the non-return valve performs a control function therefor. Alternatively, the device for receiving the defined volume of pressure medium is provided in a component that is separate from the valve housing or the non-return valve. This could be a pressure accumulator that is emptied in a depressurized state while the tension mechanism is retensioned. Such pressure accumulator then is subsequently connected to the pressure chamber of the hydraulic cylinder.

Preferably, the non-return valve comprises as the closing body a plunger that is displaceable in a valve sleeve. When the non-return valve is open, the pressure-medium supply bore is connected via at least one transverse opening provided in the valve sleeve to the pressure chamber of the hydraulic cylinder. As a result, the non-return valve is substantially different from embodiments with non-return valves formed as a poppet valve because this is a gate valve with no oil lost to leakage, where the plunger opens or closes a cross section of the transverse opening depending on the position.

In an embodiment of the non-return valve (or independently thereof), the non-return valve comprises a plunger. The plunger is displaceable in a valve sleeve and is displaced by a specified maximum distance in a valve sleeve due to the pressure in the pressure chamber. End faces of the plunger are acted upon by the pressure from the pressure-medium supply bore and the pressure present in the pressure chamber combined with the preload from a compression spring. Therefore, after pressure medium is fed into the pressure chamber, the increasing pressure, in combination with the spring force, displaces the plunger in the direction of the pressure-medium supply bore. This creates a defined space that is used to receive a certain volume of pressure medium. As a result, the tension applied to the tension mechanism is relieved to a defined extent. The relieved tension makes it possible to prevent overtension, to prevent damage to the antifriction mounting of the wheels that guide the tension mechanism and to prevent damage to the drive of the conveying device.

Furthermore, the plunger has a section shaped as a truncated cone on the end thereof pointing in the direction of the pressure-medium supply bore. This design of the plunger ensures that the closing and opening of the at least one transverse opening provided in the valve sleeve takes place with a throttling effect and, therefore, in a damped manner. The design also provides for a plunger with a stepped design and a corresponding chamfer in a region in which the plunger is guided in the receiving bore of the valve sleeve in a sealing manner. The entire unit, comprised substantially of the plunger, the compression spring, and the valve sleeve, is disposed directly in a head part of the hydraulic cylinder or separately therefrom. The truncated-cone design simplifies installation of the seals.

In an embodiment, the plunger includes a section having a reduced diameter on the end thereof pointing in the direction of the pressure chamber and, a guide tube extending therefrom. The plunger is guided via the guide tube in a valve housing. Via this guide tube and, transverse bores extending therefrom, the pressure medium travels from the pressure chamber into a chamber in which the pressure-medium pressure acts at least on an annular surface provided on the plunger.

The hydraulic cylinder also is equipped with a drain plug. The drain plug allows draining the pressure medium from the cylinder, in order to retract the plunger manually. The tension mechanism is released to permit repair and maintenance work on the conveying device.

Alternatively, the hydraulic cylinder may include a pressure-relief plug. The pressure-relief plug can be used, in the depressurized state, to drain oil via the pressure-medium supply bore in order to remove the hydraulic cylinder.

The device for tensioning a tension mechanism of a conveying device is preferably used in combine harvesters. A corresponding conveying device in the form of a chain conveyor is used, inter alia, as a grain elevator. Grain, rapeseed, or corn kernels are fed to this grain elevator via a horizontal conveyor auger having a shared drive. Plate-shaped feeder aids, which are disposed on the tension mechanism designed as a chain, are conveyed into a grain tank disposed above a threshing mechanism of the combine harvester. The device for tensioning according to the invention makes it possible to exactly adjust the plate-shaped feeder aids of the tension mechanism, which is significant for the accuracy of the detection of the crop flow since the filling height on the feeder aids is detected for this purpose. This is advantageous, in particular, when the conveyance side is on the slack side.

The inventive device also can be used on a tailings elevator (which has a design similar to that of the grain elevator). This tailings elevator feeds components of the crop that contain contaminants back to the threshing mechanism. The components or contaminants are removed via the sieves and the tray-type shakers of the combine harvester.

The inventive device also can be provided on a feed rake designed as a chain conveyor that transports the crop from the front harvesting attachment into the threshing mechanism. Two chains disposed at a distance from one another are connected via conveyor slats. The guide sprocket of each of the two chains is equipped with a corresponding inventive tensioning device. In the case of a feed rake, the inventive device for tensioning allows for the chain to deflect, if overload occurs, by a defined amount until a stop is reached. For that matter, an optimum setting of the conveyor chain is achieved with the aid of the hydraulic tensioning device, which brings about a specific loosening subsequent to a tensioning procedure.

Furthermore, in the event that the conveying device is designed as an elevator, the chain sprocket of the guide wheel is guided via a shaft in roller bearings. The roller bearings are preferably designed as flanged bearings. Slots are provided in a housing of the chain conveyor in the region of the flanged bearings. Flanged bearings are displaced by means of the hydraulic cylinder. The flanged bearings engage into these slots via an annular section, wherein a flange bears squarely against the housing of the chain conveyor.

Within this context, a coupling rod extends on either side of the housing and is connected via an eccentric or a rocker lever to the flanged bearing and via a brace to the piston rod of the hydraulic cylinder. The coupling rods induce rotation of the eccentric or the rocker lever, thereby making it possible to linearly displace the flanged bearings into the slots.

The device is connected to a constant-pressure system.

Preferably, the device comprises a hydraulic accumulator. The hydraulic accumulator provides the pressure medium with constant pressure.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
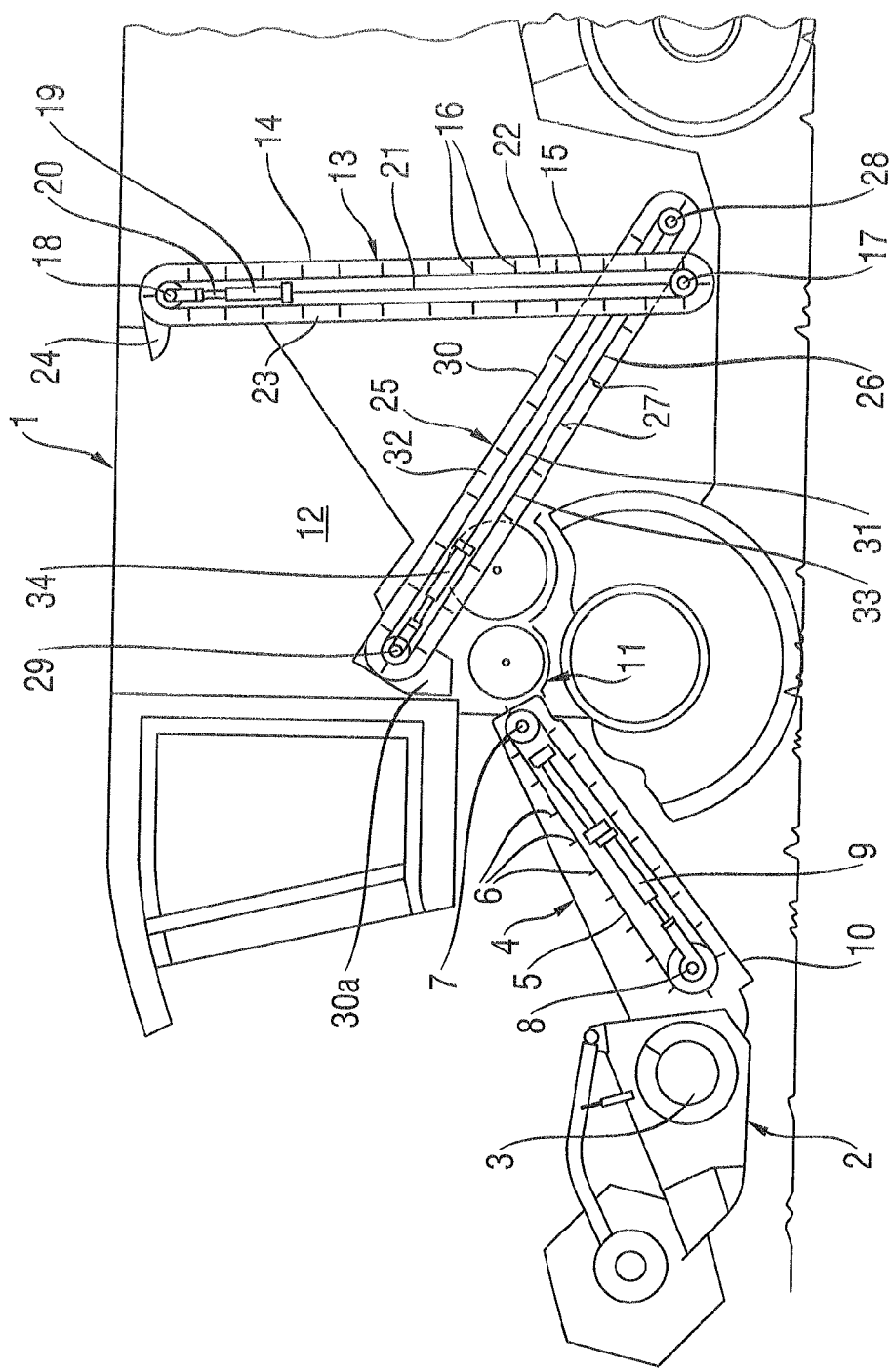
FIG. 1 shows a partial view of a self-propelled combine harvester having three conveying devices in the form of chain conveyors.

In FIG. 1, reference numeral 1 designates a self-propelled combine harvester comprising a front harvesting attachment 2 designed, for example, as a grain or rapeseed header, in the front region thereof. One component of this front harvesting attachment 2 is a horizontally disposed header auger 3, which, as a cross conveyor, brings the crop together into a central region of the front harvesting attachment 2. The central region is designed as a header table, and, from there, feeds the crop to a feed rake 4. The feed rake 4 is a chain conveyor and comprises two chains 5. Only one of the two chains 5 is shown in FIG. 1. These chains 5 are disposed at a distance from one another and accommodate feeder aids designed as conveyor slats 6.

Chains 5 are each guided on a drive sprocket 7 and a guide sprocket 8. The particular guide sprocket 8 can be displaced by means of a hydraulic cylinder 9 assigned to the guide sprocket 8 in order to regulate the tension of the chains 5. The feed rake 4 also comprises a sheet-metal housing 10, which interacts in the lower region thereof with the conveyor slats 6 to convey the stalk crop. The hydraulic cylinders 9 for tensioning the chains 5 can also be disposed outside of the sheet-metal housing 10.

The crop (which is cut and picked up by the front harvesting attachment 2), is fed via the feed rake 4 to a threshing mechanism 11 having a twin-drum design. The self-propelled combine harvester 1 according to FIG. 1 includes a grain tank 12, in which the crop (e.g., wheat or rapeseed) is collected and transferred via a non-illustrated device for emptying the grain tank to a transport container placed on the field.

FIG. 1 also shows that a grain elevator 13 conveys the crop from a lower region of the combine harvester 1 into the grain tank 12. As mentioned above, the crop is grain or rapeseed in a state in which it has been cleaned by means of non-illustrated sieves of a cleaning device. The grain elevator 13 comprises a housing 14, a chain 15 functioning as the tension mechanism and plate-shaped feeder aids 16. The plate-shaped feeder aids 16 are attached to the chain 15 at a distance from one another. The chain 15 is guided on a drive sprocket 17, which can be connected to a non-illustrated, horizontal conveyor auger. This conveyor auger first transports the crop passing through the sieves of the combine harvester 1 into the grain elevator 13. At the other end of the grain elevator, the chain 15 is guided on a guide sprocket 18, wherein said guide sprocket 18 can be displaced relative to the drive sprocket 17 such that the chain 15 can be tensioned.

A hydraulic cylinder 19 comprising a piston rod 20 is provided for tensioning chain 15. The hydraulic cylinder acts directly or indirectly on the guide sprocket 18 in the center of the grain elevator 13 (see FIG. 1). The housing 14 of the grain elevator 13 is subdivided via a partition 21 into a conveyor chute 22 (in which the slack side is located), and a return chute 23 (in which the tight side is located). The housing 20 also comprises an output element 24 in the end section thereof facing the grain tank 12, in the region of which a cross auger is also usually located. This conveys the crop from the grain elevator 13 into the grain tank 12 and distributes the grain therein.

The self-propelled combine harvester 1 (FIG. 1) also is provided with a tailings elevator 25. Tailings elevator 25 basically corresponds to the grain elevator 13 in terms of design and function. The tailings elevator 25 comprises a chain 26 to accommodate plate-shaped feeder aids 27. The chain 26 is guided via a drive sprocket 28 and a guide sprocket 29 in a housing 30. The housing 30 is subdivided via a partition 31 into a conveyor chute 32 and a return chute 33. The housing 30 also comprises an outlet 30a in the region of the threshing mechanism 11. This permits crop that accumulates in the form of non-threshed ears to be fed back to the threshing mechanism 11. These portions of the crop (which are fed to the tailings elevator 25 in the lower region), originate (as the portion of the crop that is separated out), from the sieves or via a return pan from the tray-type shakers of the combine harvester 1. The chain 26 of the tailings elevator 25 also can be tensioned via a hydraulic cylinder 34 in a manner analogous to the arrangement within the grain elevator 13.

Figure 2:
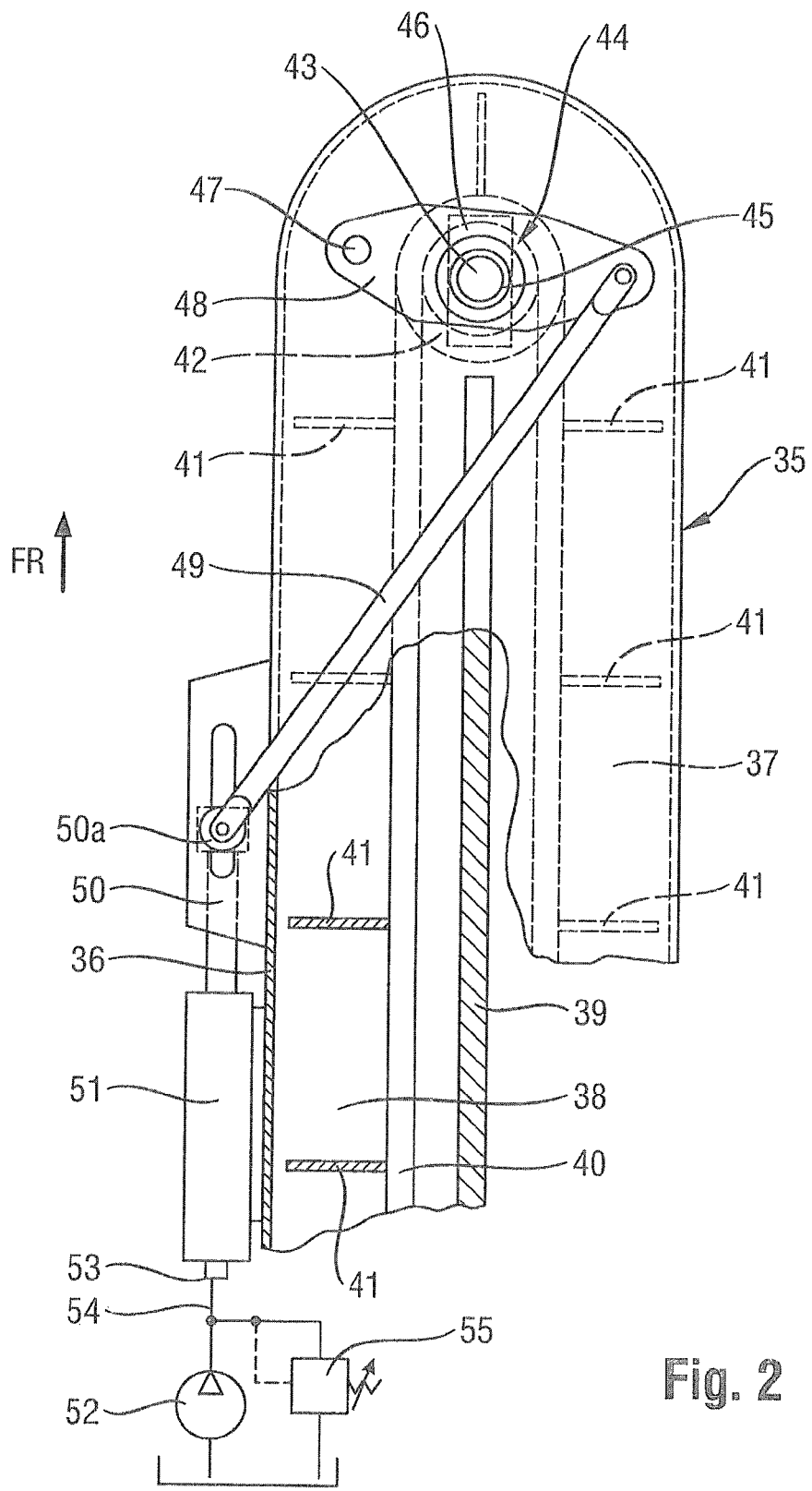
FIG. 2 shows a partial view of a grain elevator having a partial longitudinal cross section in the region of a tension mechanism and feeder aids fastened thereon.

FIG. 2 shows an upper region of a grain elevator 35, which comprises a housing 36 and a partition 39. The partition subdivides the interior of the housing 36 into a conveyor chute 37 and a return chute 38. A schematically depicted chain 40 (which accommodates feeder aids 41 at regular intervals), is disposed in the interior of this housing 36. The conveyance direction of the grain elevator is indicated by an arrow FR. The chain 40 is guided at the upper end of the housing 36 via a guide sprocket 42. The guide sprocket 42 is fastened to a shaft 43 and is supported in the housing 36 via two flanged bearings 44. Only one of these flanged bearings 44 is shown in the depiction. Each of the two flanged bearings 44 comprises a cylindrical collar 45 in the axial direction, by way of which said flanged bearing is guided in a guard 46 of the housing 36.

A rocker lever 48, which is pivotably guided at one end thereof via a swivel pin 47 on the housing 36, encloses the particular cylindrical collar 45 of the flanged bearing 44. Another end of this rocker lever 48 is connected to a coupling rod 49. This coupling rod 49 is connected at the other end thereof via a transversely extending brace 50a to a piston rod 50 of a hydraulic cylinder 51. The coupling rod 49 acts on the rocker lever 48, two of which are assigned to the grain elevator 35, as is the case for the flanged bearing 44 and the rocker lever 48 as well. The hydraulic cylinder 51 is fixedly disposed on the housing 36. The arrangement of this hydraulic cylinder 51 and, therefore, the type of displacement of the guide sprocket 42, differs from the arrangement according to FIG. 1.

The hydraulic cylinder 51 is supplied with constant pressure via a constant-pressure source. To this end, a hydraulic pump 52 supplies the hydraulic cylinder 51 with pressure medium. A pressure line 54 connecting the hydraulic pump 52 to a pressure-medium supply bore 53 is connected to a pressure-limiting valve 55, via which the maximum pressure of the pressure medium reaching the hydraulic cylinder 51 can be set.

Figure 3:
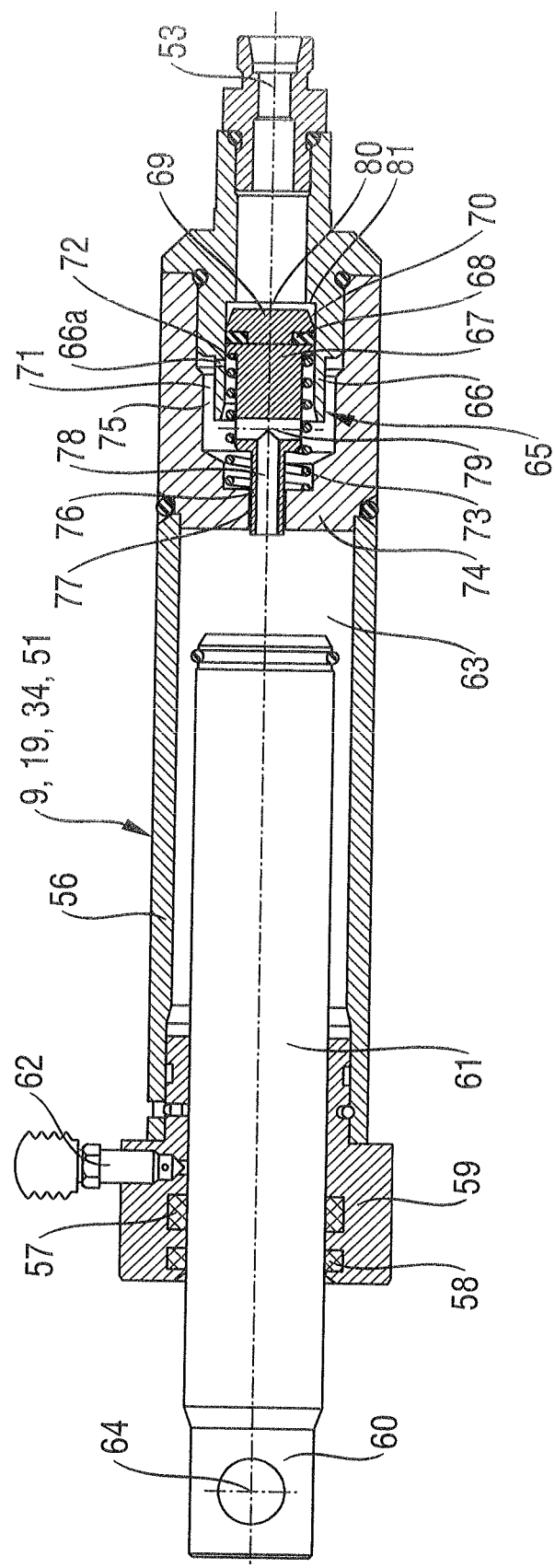
FIG. 3 shows a longitudinal cross section of a hydraulic cylinder, according to the invention, of a device for tensioning a tension mechanism of a conveying device, comprising a check valve, which is in the blocking position thereof.
Figure 4:
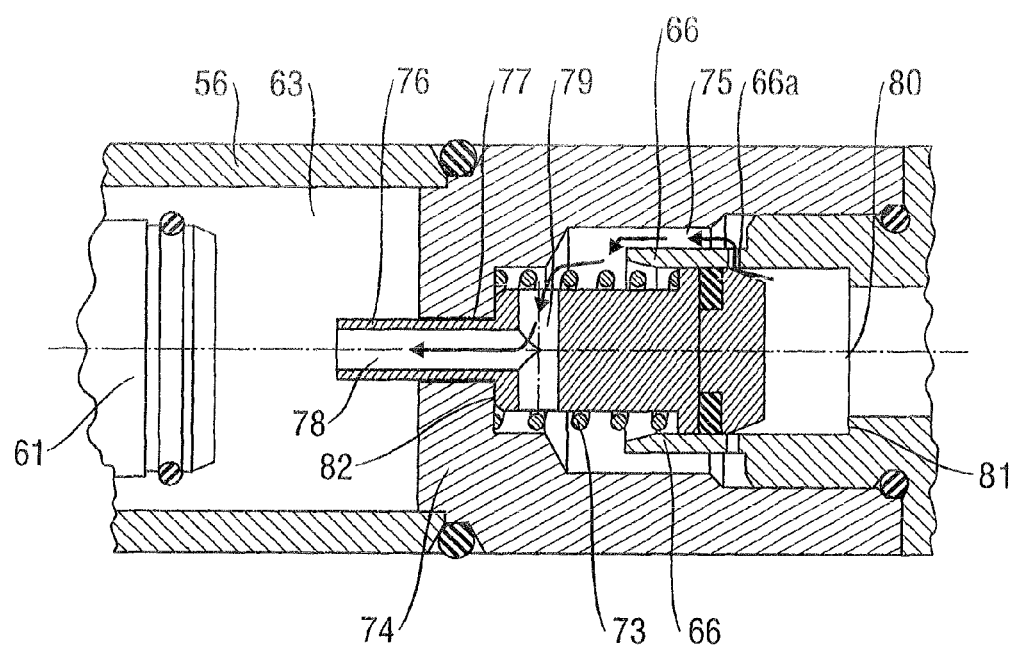
FIG. 4 shows an enlarged section IV of the depiction according to FIG. 3, wherein the check valve is in the open position thereof.

FIG. 2 shows an arrangement via which the preload on the tension mechanism designed as a chain 40 can be automatically set. Reference is made to FIGS. 3 and 4 to explain the device according to the invention that is used within the framework of this device for tensioning the chain 40 and that is used in corresponding arrangements of hydraulic cylinders according to FIG. 1. The hydraulic cylinder is suitable for tensioning tension mechanisms in conveying devices (FIGS. 1 and 2), and labeled with reference signs 9, 19, 34 and 51.

The single-action hydraulic cylinder 9, 19, 34, 51 (FIG. 3) comprises a cylindrical tube 56, a seal 57, and a cylinder head 59, which accommodates scrapers 58, and a hydraulic piston 61 equipped with a piston rod 60. A drain plug 62 is disposed within the cylinder head 59, via which pressure can be relieved from a pressure chamber 63 within the hydraulic cylinder 9, 19, 34, 51 in order to perform repair or maintenance work. The piston rod 60 comprises a rod eye 64, via which the piston rod 60 is coupled to the coupling rod 49 by means of a non-illustrated bolt in the arrangement according to FIG. 2. In the arrangement according to FIG. 1, the piston rod is coupled directly to a mounting of the corresponding guide sprocket 8, 18, 29, 42.

At an opposite end, the hydraulic cylinder 9, 19, 34, 51 is connected to a valve arrangement. Via the valve arrangement, pressure medium is directed from the pressure-medium supply bore 53 into the pressure chamber 63, or the pressure chamber 63 is blocked with respect to this pressure-medium supply bore 53. A check valve 65 is provided for this purpose.

The check valve comprises a hollow cylindrical valve sleeve 66 and a plunger 67, which is displaceable therein. The plunger 67 accommodates a sealing ring 68, via which the plunger 67 is guided in a sealing manner on an inner jacket surface of the valve sleeve 66. The plunger 67 also has an end face 69, which is acted upon by the pressure of the pressure medium from the pressure-medium supply bore 53. A truncated-cone shaped section 70 (i.e., a chamfer of the plunger 67), adjoins this end face 69, while the plunger 67 is stepped on the side thereof facing away from the end face 69.

As a result, an annular chamber 71 and an annular contact surface 72 are created between the plunger 67 and the valve sleeve 66. A compression spring 73 extends within this annular chamber 71, which bears at one end thereof against the annular contact surface 72 of the plunger 67 and, at the other end thereof, against a valve housing 74. The valve sleeve 66 (which is disposed within this valve housing 74), furthermore comprises a transverse bore 66a, via which the annular chamber 71 (formed between the plunger 67 and the valve sleeve 66 in FIG. 3) is connected to a further annular chamber 75 disposed between the valve sleeve 66 and the valve housing 74.

A guide tube 76 also extends from the plunger 67. The guide tube is displaceable in a bore 77 of the valve housing 74. This guide tube 76 comprises a longitudinal channel 78, which is connected to a transverse channel 79 extending in the inwardly offset section of the plunger 67. In addition, the valve sleeve 66 is equipped in the interior thereof with a stepped bore 80, and so the plunger 67, which extends in an expanded bore region, is moved in the direction of the pressure-medium supply bore 53 against an annular stop 81. Such movement takes place due to the pressure present in the pressure chamber 63 with support from the compression spring 73.

In the depiction according to FIG. 3, the plunger 67 is located in a position in which the end face 69 thereof is located close to the annular stop 81. The plunger 67 blocks a connection between the pressure-medium supply bore 53 to the transverse bore 66a. Therefore (in this position of the plunger 67), additional pressure medium cannot travel from the pressure-medium supply bore 53 into the pressure chamber 63.

In contrast, plunger 67 (see FIG. 4) is located in the far-left position thereof, in which the plunger 67 bears via an annular surface 82. Annular surface 82 radially encloses the guide tube 76 against a corresponding surface of the valve housing 74. In this position of the plunger 67 (which is attained in the event of a pressure drop in the pressure chamber 63 and, therefore, a reduction in the preload of the chain), pressure medium can travel from the pressure-medium supply bore 53 via a throttle gap. The throttle gap is formed by the truncated-cone shaped section 70 of the plunger opposite the stepped bore 80, and then via the transverse bore 66a, the annular chamber 75, the transverse channel 79, and the longitudinal channel 78 into the pressure chamber 63 in order to equalize the reduced pressure here.

Once this pressure is equalized (i.e. the corresponding chain has been retensioned) due the resultant pressure build-up in the pressure chamber 63 and the resultant force (which act together with the compression spring 73 on the plunger 67), the plunger 67 is displaced in the direction of the far-right position thereof. Such positioning initially blocks the transverse bore 66a, and additional space is subsequently created via the retraction of the plunger 67. This is used to receive a defined volume of pressure medium from the pressure chamber 63. The preload on the chain is thereby loosened slightly, protecting the drive of the chain, the mounting thereof, and the chain itself against overload. The plunger 67, together with the transverse bore 66a, has a switching behavior with hysteresis, i.e., the transverse bore 66a is not reopened until the pressure in the pressure chamber 63 falls below a specified limit value.

Figure 5:
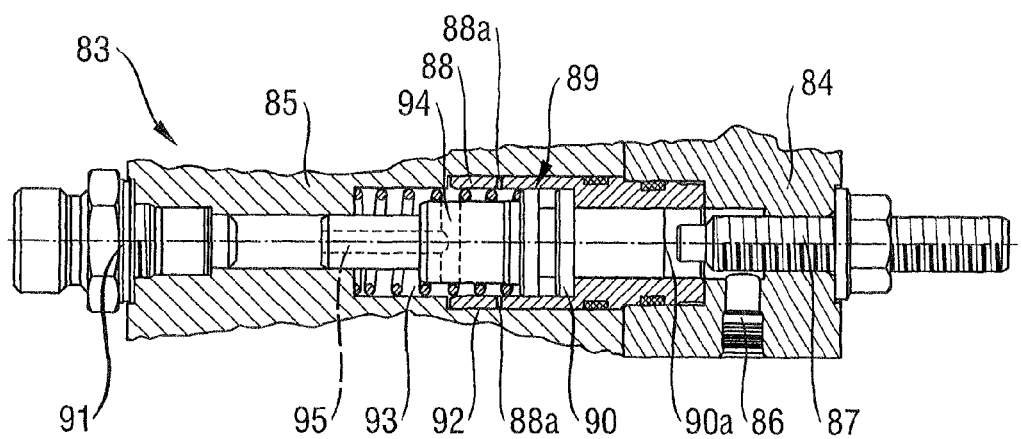
FIG. 5 shows a longitudinal cross section of a valve arrangement comprising a check valve and a device for receiving a defined volume of pressure medium, which can be disposed separately from an element that preloads a tension mechanism of a conveying device.

FIG. 5 depicts a separate check valve 83. Separate check valve 83 performs the same functions as the valve arrangement according to FIGS. 3 and 4. This check valve 83 also is equipped with the device for receiving a defined volume of pressure medium, but is disposed separately from a corresponding hydraulic cylinder. This check valve 83 is disposed within a two-piece valve housing 84, 85. A pressure-medium supply bore 86 leads into the valve housing 84, in the region of which a pressure-relief plug 87 is located. Furthermore, the valve housing 84 and the valve housing 85 accommodate a valve sleeve 88, in which a plunger 89 extends. This plunger 89 also has a truncated-cone shaped control section 90, via which said plunger interacts with a transverse bore 88a disposed in the valve housing 88.

The second valve housing 85 accommodates a working port 91. Working port 91 is connected to a hydraulic lifting cylinder for use in a tensioning device provided within a conveying device. The plunger 89 has a stepped design, i.e., in the central section thereof, the plunger has a region having the previously mentioned truncated-cone shaped control section 90. The region is guided in the valve sleeve 88 in a sealing manner. A tapered section of the plunger 89 extends in the direction of the pressure-relief plug 87, on the end face 90a of which the pressure from the pressure-medium supply bore 86 acts.

In addition, the pressure-relief plug 87 can be moved against this end face 90a and then exert an actuating motion on the plunger 89. This moves the plunger 89 into the position thereof that unblocks the transverse bore 88a. The transverse bore 88a is connected via an annular gap 92 to a spring chamber 93 and, from there, via a transverse channel 94 and a longitudinal channel 95 to the working port 91. This connection also makes it possible to drain oil via the pressure-medium supply bore 86 in the stationary, depressurized state of the combine harvester 1. Such operation thereby permits the hydraulic cylinder to be removed in order to tension the tension mechanism.

According to FIG. 5 as well, the plunger 89 (which is located in the blocking position thereof), is shifted from this position to the left by means of a pressure drop at the working port 91 while pressure is simultaneously present at the pressure-medium supply bore 86, thereby unblocking the transverse bore 88a. In this position of the plunger 89, the pressure medium flows via the truncated-cone shaped control section 90 and the transverse bore 88a, the annular gap 91, the spring chamber 92, the transverse channel 94, and the longitudinal channel 95 to the working port 91.

If pressure builds up at the working port 91 and exceeds a certain limit value, however, the plunger 89 is displaced back into the position thereof depicted in FIG. 5.

Due to the path traversed by the plunger 89, a defined space is created for receiving the pressure medium present in the region of the working port 91, thereby reducing the pressure. As a result, the connected tensioning device is relieved of preload force to a slight extent, thereby protecting the tension mechanism of the corresponding conveying device from damage that would otherwise occur due to excessive preload.

The following list of reference signs of various elements mentioned above is included (as follows), for ease of explanation:

REFERENCE CHARACTERS

1 self-propelled combine harvester
2 front harvesting attachment
3 header auger
4 feed rake
5 chains
6 conveyor slats
7 drive sprocket
8 guide sprocket
9 hydraulic cylinder
10 sheet-metal housing
11 threshing mechanism
12 grain tank
13 grain elevator
14 housing
15 chain
16 feeder aid
17 drive sprocket
18 guide sprocket
19 hydraulic cylinder
20 piston rod
21 partition
22 conveyor chute
23 return chute
24 output element
25 tailings elevator
26 chain
27 feeder aid
28 drive sprocket
29 guide sprocket
30 housing
30a outlet
31 partition
32 conveyor chute
33 return chute
34 hydraulic cylinder
35 grain elevator
36 housing
37 conveyor chute
38 return chute
39 partition
40 chain
41 feeder aid
42 guide sprocket
43 shaft
44 flanged bearing
45 cylindrical collar
46 slot
47 swivel pin
48 rocker lever
49 coupling rod
50 piston rod
50a brace
51 hydraulic cylinder
52 hydraulic pump
53 pressure-medium supply bore
54 pressure line
55 pressure-limiting valve
56 cylindrical tube
57 seal
58 seal
59 cylinder head
60 piston rod
61 hydraulic piston
62 drain plug
63 pressure chamber
64 rod eye
65 check valve
66 valve sleeve
66a transverse bore 67 plunger
68 sealing ring
69 end face
70 truncated-cone shaped section
71 annular chamber
72 annular contact surface
73 compression spring
74 valve housing
75 annular chamber
76 guide tube
77 bore
78 longitudinal channel
79 transverse channel
80 stepped bore
81 annular stop
82 annular surface
83 check valve
84 valve housing
85 valve housing
86 pressure-medium supply bore
87 pressure-relief plug
88 valve sleeve
88a transverse bore
89 plunger
90 truncated-cone shaped control section
90a end face
91 working port
92 annular gap
93 spring chamber
94 transverse channel
95 longitudinal channel As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A device for tensioning at least one tension mechanism of a conveying device, said tension mechanism comprising
a multiplicity of feeder aids extending between a drive wheel and at least one guide wheel,
at least one hydraulic cylinder, including a hydraulic piston, for adjusting a wheel center distance between the at least one guide wheel and the drive wheel in order to change the tension of the tension mechanism, wherein the at least one hydraulic cylinder acts directly on the guide wheel,
wherein, in order to tension the tension mechanism, the hydraulic piston is displaceably disposed in a pressure chamber and acted upon by pressure medium from a pressure source via a check valve that opens toward the pressure chamber,
wherein, once a blocked state of the check valve is reached, the pressure chamber is connected to a device for receiving a defined volume of pressure medium, and
wherein the check valve is a non-return valve, and wherein a closing body of the non-return valve is spring-loaded in the direction of a pressure-medium supply bore and forms one assembly in combination with the device for receiving the defined volume of pressure medium.

2. The device for tensioning according to claim 1, wherein the non-return valve, as a closing body with no oil lost to leakage, comprises a plunger that is displaceable in a valve sleeve and configured to operate such that when the non-return valve is open, the pressure-medium supply bore is connected via at least one transverse opening provided in the valve sleeve to the pressure chamber of the hydraulic cylinder.

3. The device for tensioning according to claim 1, wherein the non-return valve comprises a plunger that is displaceable in a valve sleeve and which can be displaced by a specified maximum distance in a valve sleeve due to the pressure in the pressure chamber.

4. The device for tensioning a tension mechanism of a conveying device according to claim 2, wherein the plunger has a truncated-cone shape on the end thereof pointing in the direction of the pressure-medium supply bore.

5. The device for tensioning a tension mechanism according to claim 2, wherein the plunger has a section with a reduced diameter on the end thereof pointing in the direction of the pressure chamber and a guide tube extending therefrom, and wherein the plunger is guided via the guide tube in a valve housing.

6. The device for tensioning a tension mechanism according to claim 1, wherein the hydraulic cylinder includes a drain plug.

7. The device for tensioning a tension mechanism according to claim 1, wherein the hydraulic cylinder includes a pressure-relief plug.

8. The device for tensioning a tension mechanism according to claim 1, wherein the conveying device is a chain conveyor of a grain elevator, a tailings elevator or a feed rake for a combine harvester.

9. The device for tensioning a tension mechanism according to claim 8, wherein the chain sprocket of the guide wheel is guided via a shaft in flanged bearings and wherein slots are provided in a housing of the chain conveyor in the region of the flanged bearings in order that the flanged bearings are displaceable using the hydraulic cylinder.

10. The device for tensioning a tension mechanism according to claim 9, wherein a coupling rod extends on either side of the housing and is connected via an eccentric or a rocker lever to the flanged bearing and via a brace to the piston rod of the hydraulic cylinder.

11. The device for tensioning according to one of the claim 1, wherein the device is connected to a constant-pressure system.

12. The device for tensioning according to claim 1, further comprising a hydraulic accumulator that provides the pressure medium with constant pressure.

* * * * *